United States Patent [19]

Kimizawa

[11] Patent Number: 4,799,288
[45] Date of Patent: Jan. 24, 1989

[54] PIVOT BUSH

[75] Inventor: Toshihide Kimizawa, Yokohama, Japan

[73] Assignee: Nifco Inc., Yokohama, Japan

[21] Appl. No.: 131,122

[22] Filed: Dec. 10, 1987

[30] Foreign Application Priority Data

Dec. 15, 1986 [JP] Japan .................. 61-191713[U]

[51] Int. Cl.⁴ ............................................. F16L 5/02
[52] U.S. Cl. ..................................... 16/2; 174/153 G
[58] Field of Search ............ 16/2, 273, 386, DIG. 27; 174/65 G, 152 G, 153 G; 384/208, 209; 248/56

[56] References Cited

U.S. PATENT DOCUMENTS

| 3,788,655 | 1/1974 | Hathaway | 174/153 G |
| 4,299,363 | 11/1981 | Datschefski | 174/153 G |
| 4,380,860 | 4/1983 | Riesfer et al. | 16/2 |
| 4,686,738 | 8/1987 | Bladh | 16/2 |

FOREIGN PATENT DOCUMENTS

| 1087207 | 8/1960 | Fed. Rep. of Germany | 174/153 G |
| 2378197 | 9/1978 | France | 248/56 |
| 59-77120 | 5/1984 | Japan |  |
| 62-82420 | 5/1987 | Japan |  |
| 8200809 | 10/1983 | Netherlands | 174/153 G |

Primary Examiner—Nicholas P. Godici
Assistant Examiner—Edward A. Brown
Attorney, Agent, or Firm—Trexler, Bushnell, Giangiorgi & Blackstone, Ltd.

[57] ABSTRACT

A plastic pivot bush for swingably holding upper and lower spherical surface portions with respect to an equator of a spherical pivot, includes an upper concave spherical surface, a main body connected onto the upper concave spherical surface to enclose the remaining portion of the spherical pivot and having therein a cylindrical surface with a lower end thereof opened up, and an elastic thin piece originating from the boundary between the upper concave spherical surface and the cylindrical surface and provided with an opening at the center of a lower portion thereof. The elastic thin piece is split into a plurality of pieces by a plurality of slits extending in the longitudinal direction. The main body has at an outer periphery thereof an annular groove engageable with a mounting hole of the arm.

8 Claims, 4 Drawing Sheets

PIVOT BUSH

BACKGROUND OF THE INVENTION

1. Field of the Invention

This invention relates to a pivot bush made of a plastic material for swingably holding a spherical pivot and more particularly to a bush of a pivot to be used for a linkage mechanism for actuating, for example, a wiper of an automobile.

2. Prior Art Statement

Pivot bushes made of plastic material have been proposed heretofore in, for example, Japanese Patent Public Disclosure No. SHO 59-77120 and Japanese Utility Model Public Disclosure No SHO 62-82420. These bushes swingably hold the spherical surface portion of a spherical pivot and integrally include a mounting portion for mounting a plate shaped workpiece to a mounting hole These pivot bushes are constructed such that two halves of generally the same shape constituting a bush body and each comprising a shell with a semi-spherical cavity and a mounting portion formed integrally with the shell and mounted on a work, are connected together by a hinge, and by combining the two halves into one body by bending the hinge, a half part of a spherical pivot is held in the cavity of each shell, and the combined halves are mounted in a mounting hole of a panel by both the mounting portions.

However, since the conventional pivot bush comprises two divided halves, the structure thereof is complicated. In addition, the holding of the spherical pivot and the mounting thereof on a work are very troublesome.

OBJECT AND SUMMARY OF THE INVENTION

A general object of the present invention is to provide a pivot bush which is simple in structure, easy to insert to or withdraw from a pivot and capable of reliably holding the pivot.

In order to achieve the above-mentioned object, a pivot bush according to the present invention comprises an upper concave spherical surface corresponding to a portion or the whole of a spherical surface portion above an equator of a spherical pivot, a main body connected onto the upper concave spherical surface to enclose the remaining portion of the spherical pivot under the equator and having therein a cylindrical surface with a lower end thereof opened up, and an elastic thin piece originating from a boundary between the upper concave spherical surface and the cylindrical surface and provided with an opening at the center of a lower portion thereof, an inner surface of the elastic thin piece forming a lower concave spherical surface corresponding to a part of the lower spherical surface portion under the equator of the spherical pivot, the elastic thin piece being split into a plurality of pieces by a plurality of slits which are formed by cutting the elastic thin piece from the opening of the center of the lower portion thereof in the longitudinal direction, the main body having at an outer periphery thereof an annular groove engageable with a marginal portion of a mounting hole of a plate-shaped arm along the boundary between the upper concave spherical surface and the cylindrical surface.

In order to hold the spherical pivot with the pivot bush constructed as mentioned above, the marginal portion of the mounting hole is engaged with the annular groove formed in the outer periphery of the main body, and thereafter, the spherical pivot is inserted into the opening of the center of the lower portion of the elastic thin piece. That is, if the spherical pivot is inserted, the upper spherical surface portion is abutted against the lower end of the elastic thin piece to strongly push the spherical pivot further therein. As a result, the respective pieces of the elastic thin piece split by the respective slits are pushed by the spherical surface portion and deformed outwards in the radial direction to pass the opening of the elastic thin piece. And, if the spherical surface portion above the equator of the spherical pivot is fitted into the upper concave spherical surface, the elastic thin piece is restored to its original state by the restoring force thereof and the portion under the equator of the spherical pivot is elastically held by the lower concave spherical surface, while the spherical surface portion above the equator of the pivot is held by the upper concave spherical surface.

As described in the foregoing, the pivot bush according to the present invention holds the pivot in such a manner as that the pivot can be reliably swung by a simple operation.

The above and other objects and features of the invention will become more apparent from the following detailed description with reference to the accompanying drawings.

DETAILED DESCRIPTION OF THE PREFERRED EMBODIMENT

Figure 1:
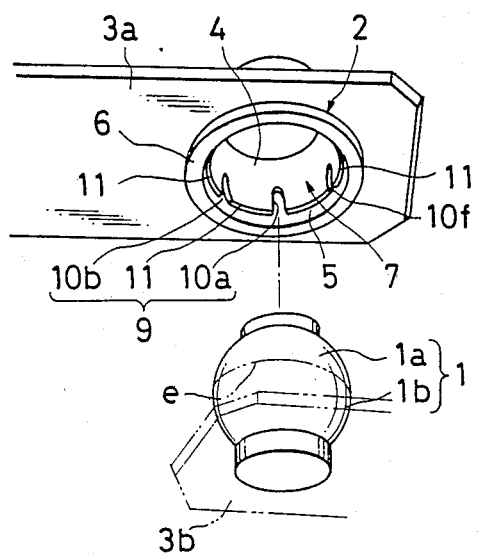
FIG. 1 is an exploded perspective view showing one embodiment of the pivot bush according to the present invention.
Figure 2:
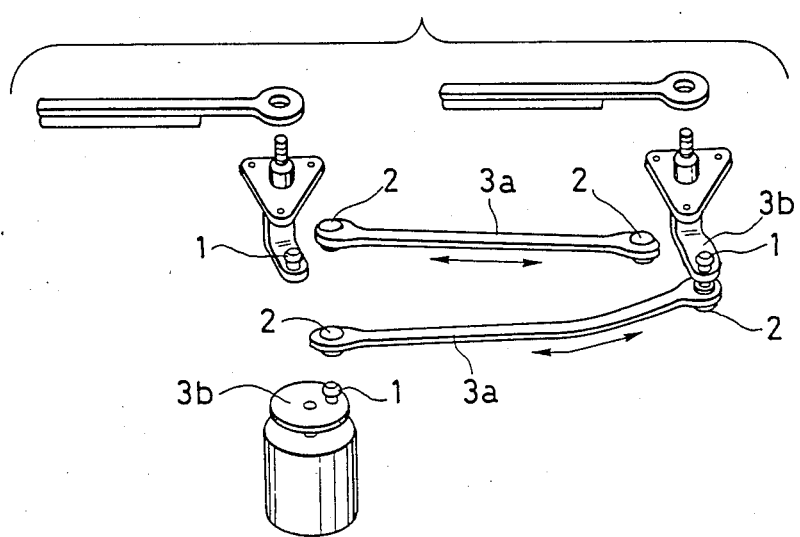
FIG. 2 is an exploded perspective view of a wiper mechanism for exclusive use in an automobile and connected by a pivot.
Figure 3:
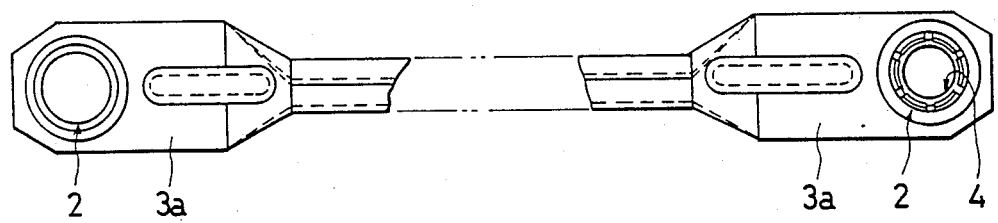
FIG. 3 is a plan view of a link of the wiper mechanism of FIG. 2.

Referring to the drawings, 1 denotes a spherical pivot and 2 denotes a pivot bush. These spherical pivot 1 and pivot bush 2 are respectively mounted on arms 3a and 3b of a wiper mechanism of an automobile as exemplified in FIG. 2. By inserting the pivot 1 into the bush 2, the arms 3a and 3b are swingably connected together, thereby to form a linkage mechanism.

The pivot bush 2, as shown in FIGS. 4 through 8, comprises an upper concave spherical surface 4 having a generally bowl shape corresponding to the shape of a part or the whole of an upper spherical surface portion 1a above the equator e of the spherical pivot 1, a main body connected onto the upper concave spherical surface 4 to enclose a lower part under the equator e of the spherical pivot 1 and having inside thereof a cylindrical surface 5 with a lower end opened up, and a generally bowl-shaped elastic thin piece 9 originating from the boundary between the upper concave spherical surface 4 and the cylindrical surface 5 and having an opening 7 at the center of a lower part thereof, the inner surface of the piece 9 forming a lower concave spherical surface 8 corresponding to a part of a lower spherical surface portion 1b under the equator e of the spherical pivot 1.

Figure 4:
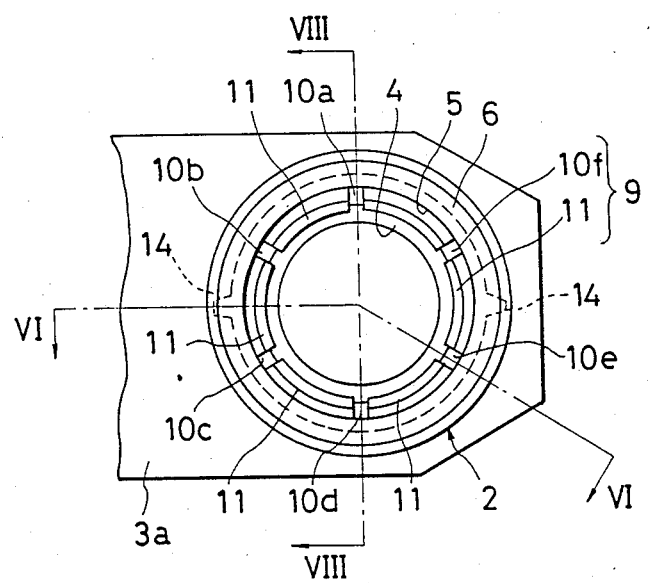
FIG. 4 is a bottom view showing the pivot bush of the present invention mounted to the link.
Figure 5:
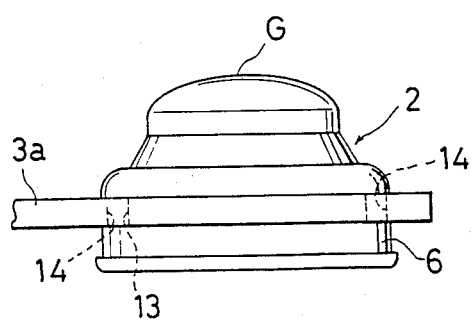
FIG. 5 is a side view thereof.
Figure 6:
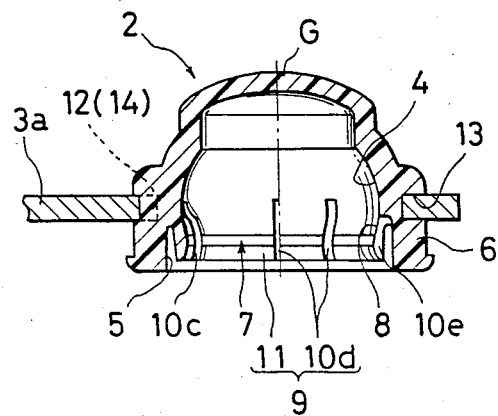
FIG. 6 is a sectional view taken along line VI—VI in FIG. 4.
Figure 7:
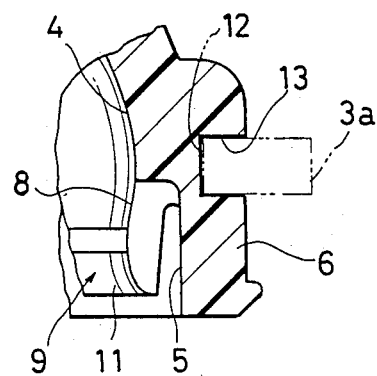
FIG. 7 is a partly enlarged sectional view of the bush of FIG. 1.
Figure 8:
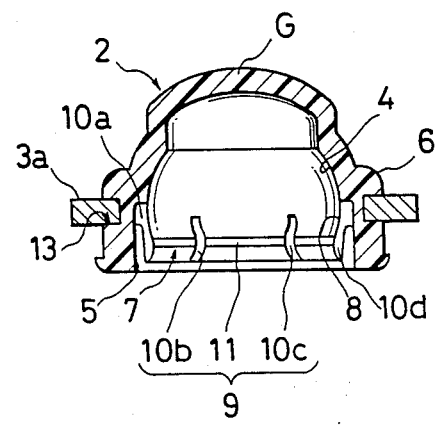
FIG. 8 is a sectional view taken along line VIII—VIII in FIG. 4.

The level of the opening 7 of the center of the lower portion of the elastic thin piece 9, i.e., the length of the lower end thereof is set to be shorter than that of the lower end of the cylindrical surface of the main body 6. The elastic thin piece 9 is split into a plurality of pieces 11 by a plurality of slits 10a, 10b, 10c . . . extending in the longitudinal direction and formed by cutting thereof from the lower end of the opening 7 of the lower center thereof. These slits, as shown in FIG. 4, are provided at six places at 60 degree intervals with reference to the position perpendicular to the operating direction (shown by the arrows in FIG. 2) of the arm 3a in this embodiment. Of them, the lower ends of a pair of opposing slits 10a and 10d at the position perpendicular to the operating direction of the arm 3a are set to be above the boundary between the upper concave spherical surface 4 and the cylindrical surface 5, while the upper ends of the remaining four slits 10b, 10c, 10e, and 10f are set to be under the boundary.

Furthermore, the outer periphery of the main body 6 is provided with an annular groove 13 engaging with the marginal portion of the mounting hole 12 of the plate-shaped arm 3a along the boundary between the upper concave spherical surface 4 and the cylindrical surface 5. In the illustrated embodiment, the mounting hole 12 of the arm 3a is provided with a pair of cut-outs 14 extending in the operating direction thereof, and the pivot bush 2 is molded of a thermoplastic synthetic resin material so that the annular groove 13 is engaged with the mounting hole 12 including the cut-outs 14. The gate position G of the bush during the molding is preferably placed at the top of the main body 6.

Figure 9:
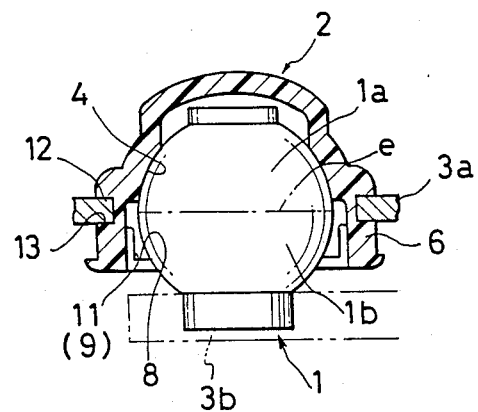
FIG. 9 is a sectional view showing the bush of the present invention in engagement with the pivot.

Next, the procedure for engaging the bush 2 and the spherical pivot 1 will be described. The spherical pivot 1 is simply inserted into the opening 7 of the lower center of the elastic thin piece 9. That is, when the spherical pivot 1 is inserted into the opening 7, the upper spherical surface portion 1a of the pivot 1 is abutted against the lower end of the elastic thin piece 9. When the spherical pivot 1 is further pushed into the opening 7 strongly, the respective pieces 11... of the elastic thin piece 9 split by the respective slits 10a, 10b, 10c . . . are pushed and deformed outwards in the radial direction by the spherical surface portion 1a of the spherical pivot 1 and pass through the opening of the elastic thin piece 9. When the spherical surface portion 1a above the equator e of the spherical pivot 1 is engaged with the upper concave spherical surface 4, the elastic thin piece 9 is restored to its original state by the elastic force thereof and the portion under the equator e of the spherical pivot 1 is elastically held by the lower concave spherical surface 8. As is shown in FIG. 9, the spherical surface portion 1a above the equator e of the spherical pivot 1 is held by the upper concave spherical portion 4, while the lower spherical surface portion 1b the equator e is elastically held by the lower concave spherical surface 8 of the elastic thin piece 9.

In this way, when the spherical pivot 1 is inserted, the spherical pivot 1 is swingable with respect to the pivot bush 2 secured to the arm 3a. At that time, since the equator e of the spherical pivot 1 and the center of the thickness of the arm 3a are brought to be substantially in alignment with each other, the transmission loss is small during the operation of the link mechanism. In addition, the strength of the pivot bush 2 can be increased with respect to the operating direction of the arm 3a.

On the other hand, since the height of the opening 7 of the lower center of the elastic thin piece 9 is set to be higher than that of the lower end of the cylindrical surface 5 of the main body 6, breaking of the elastic thin piece 9 can be prevented when the spherical pivot 1 is inserted or withdrawn, or during the operation of the link.

Of the plurality of slits splitting the elastic thin piece 9 in the longitudinal direction, the upper ends of the slits 10a and 10d formed at position perpendicular to the operating direction of the arm 3, are set to be above the boundary between the upper concave spherical surface 4 and the cylindrical surface 5. Therefore, when the spherical pivot 1 is inserted or withdrawn, air flows into or out of the interior through the slits 10a and 10d and thus, the interior of the upper concave spherical surface 4 can be prevented from assuming a vacuum state. In addition, the removability of the mold of the bush can be enhanced during the molding. Furthermore, since the upper ends of the remaining slits 10b, 10c, 10e and 10f are set to be below the boundary, the strength of each piece 11 can be enhanced with respect to the operating direction of the arm 3a.

As one procedure for mounting the pivot bush 2 to the arm 3a, the bush 2 is pushed into the mounting hole 12 defined in the arm 3a thereby engaging the marginal portion of the mounting hole 12 with the annular groove 13. As another procedure, the portion having the mounting hole 12 of the arm 3a is inserted in a predetermined position of the molding of the bush 2 to mold the bush 2 which is still engaged with the mounting hole 12 of the arm 3a. If the latter procedure is employed, the mounting operation of the bush to the arm can be eliminated. In addition, the thickness of the bush can be made thin compared with a case where the bush is pushed into the mounting hole. Therefore, the consumption of a resin material can be decreased, which is economical. Furthermore, since the mounting hole 12 of the arm 3 is formed with a cut-out 14 extending in the operating direction thereof, the co-rotation of the pivot bush 2 can be prevented. Besides, since the gate position G can be set at the top of the main body 6 during the molding, the flow of the resin can be made uniform. Therefore, the regularity of molding products can be improved. In addition, the occurrence of a weld line, etc. can be prevented compared with a case where a side gate is used.

As is apparent from the foregoing description, in a pivot bush according to the present invention, the structure is very simple, and the rigidity is high with respect to the operating direction of the arm. In addition, the insertion into and removal from the spherical pivot is simple and yet very reliable.

Obviously, many variations and modifications of the present invention can be made in light of the above teachings. It is therefore to be understood that within the scope of the appended claims, the present invention may be practiced otherwise than as specifically described herein.

What is claimed is:

1. A pivot bush made of a plastic material for swingably holding upper and lower spherical surface portions with respect to an equator of a spherical pivot, said pivot bush comprising an upper concave spherical surface corresponding at least to a portion of the upper spherical surface portion above the equator of the spherical pivot, a main body connected onto said upper concave spherical surface to enclose the remaining portion of said spherical pivot under the equator and having therein a cylindrical surface with a lower end thereof opened up, and a bowl shaped elastic thin piece originating from a boundary between said upper concave spherical surface and said cylindrical surface and provided with an opening at the center of a lower portion thereof, an inner surface of the elastic thin piece forming a lower concave spherical surface corresponding to a part of said lower spherical surface portion under the equator of said spherical pivot, said elastic thin piece being split into a plurality of pieces by a plurality of slits which extend in the longitudinal direction and are formed by cutting the elastic thin piece from the opening of the center of the lower portion thereof, said main body having at an outer periphery thereof an annular groove engageable with a marginal portion of a mounting hole of an arm along the boundary between said upper concave spherical surface and said cylindrical surface.

2. A pivot bush as claimed in claim 1, wherein the lower end of the opening of the lower portion of said elastic thin piece is higher than the lower end of said cylindrical surface of said main body.

3. A pivot bush as claimed in claim 1, wherein, of the slits splitting said elastic thin piece in the longitudinal direction, the upper ends of the slits at the position perpendicular to the operating direction of the arm are set to be above the boundary between said upper concave spherical surface and said cylindrical surface, while the upper ends of the remaining slits are set to be under said boundary.

4. A pivot bush as claimed in claim 1, wherein said mounting hole of the arm includes a cut-out extending in the operating direction thereof.

5. A pivot bush as claimed in claim 1, wherein said bush is molded of a thermoplastic synthetic resin material so that an annular groove thereof is engaged in said mounting hole of the arm.

6. A pivot bush made of plastic material for swingably holding upper and lower spherical surface portions with respect to an equator of a spherical pivot, said pivot bush comprising an upper concave spherical surface corresponding at least to a portion of the upper spherical surface portion above the equator of the spherical pivot, a main body connected onto said upper concave spherical surface to enclose the remaining portion of said spherical pivot under the equator and having therein a cylindrical surface with a lower end thereof opened up and an elastic thin piece originating from a boundary between said upper concave spherical surface and said cylindrical surface and provided with an opening at the center of a lower portion thereof, an inner surface of the elastic thin piece forming a lower concave spherical surface corresponding to a part of said lower spherical surface portion under the equator of said spherical pivot, the lower end of the opening of the lower portion of said elastic thin piece is higher than the lower end of said cylindrical surface of said main body, said elastic thin piece being slit into a plurality of pieces by a plurality of slits which extend in a longitudinal direction and are formed by cutting the elastic thin piece from the opening of the center of the lower portion thereof, said main body having at an outer periphery thereof an annular groove engageable with a marginal portion of a mounting hole of an arm along the boundary between said upper concave spherical surface and said cylindrical surface, said slits splitting said elastic thin piece in the longitudinal direction, the upper ends of the slits at the position perpendicular to the operating direction of the arm are set to be above the boundary between said upper concave spherical surface and said cylindrical surface, while the upper ends of the remaining slits are set to be under said boundary.

7. A pivot bush as claimed in claim 7, wherein the said mounting hole of the arm includes a cut-out extending in the operating direction thereof.

8. A pivot bush as claimed in claim 6, wherein said bush is molded of a thermoplastic synthetic resin material so that an annular groove thereof is engaged in said mounting hole of the arm.

* * * * *